United States Patent [19]

Silvey

[11] 4,416,169
[45] Nov. 22, 1983

[54] AUTOMATIC SAW CHAIN GRINDER

[76] Inventor: Elmer R. Silvey, 1231 Dutton Rd., Eagle Point, Oreg.

[21] Appl. No.: 249,744

[22] Filed: Mar. 31, 1981

[51] Int. Cl.³ .............................................. B23D 63/16
[52] U.S. Cl. ..................................... 76/25 A; 76/37; 76/33; 76/43
[58] Field of Search ...................... 76/25 A, 31, 33, 37, 76/40, 43; 51/216

[56] References Cited

U.S. PATENT DOCUMENTS

| | | | |
|---|---|---|---|
| 2,570,118 | 10/1951 | Hamberger | 76/43 |
| 3,313,185 | 4/1967 | Drake et al. | 76/43 |
| 3,349,645 | 10/1967 | Silvey | 76/40 |
| 3,952,615 | 4/1976 | Benson | 76/25 A |
| 4,102,223 | 7/1978 | Robinson et al. | 76/25 A |
| 4,111,075 | 9/1978 | Varley | 51/216 X |

Primary Examiner—Frederick R. Schmidt
Assistant Examiner—Debra S. Meislin
Attorney, Agent, or Firm—Klarquist, Sparkman, Campbell, Leigh & Whinston

[57] ABSTRACT

An automatic saw chain grinder includes a saw chain support mounted for reciprocative movement on a support carriage. A spring urges the carriage in one direction to move a cutter tooth of a supported saw chain into a grinding wheel against the residual pressure of fluid in a first single-acting hydraulic cylinder. Pressurization of the cylinder moves the carriage in the opposite direction away from the grinding wheel. The grinding wheel is spring-biased toward an active, grinding position and moved away from such position by a second single-acting hydraulic cylinder. The first and second cylinders are sized and the respective springs of the carriage and grinder selected such that upon pressurization of the common hydraulic circuit for such cylinders, the carriage retracts the cutter tooth away from the grinding wheel before the grinding wheel retracts from the grinding position. Conversely, upon depressurization of the circuit, the grinding wheel moves into its grinding position before the carriage moves the cutter tooth into the grinding wheel. Indexing means including a chain wheel power-operated by a reciprocating rod shifts the saw chain along its support to move each successive cutter tooth to be sharpened against a chain stop adjacent the grinding position when a tooth has been sharpened. Power-operated sequencing means including cam-operated levers control reciprocation of the rod and pressurization of the hydraulic circuit to index the chain, move the grinder, and shift the carriage in proper sequence for fully automatic operation.

18 Claims, 11 Drawing Figures

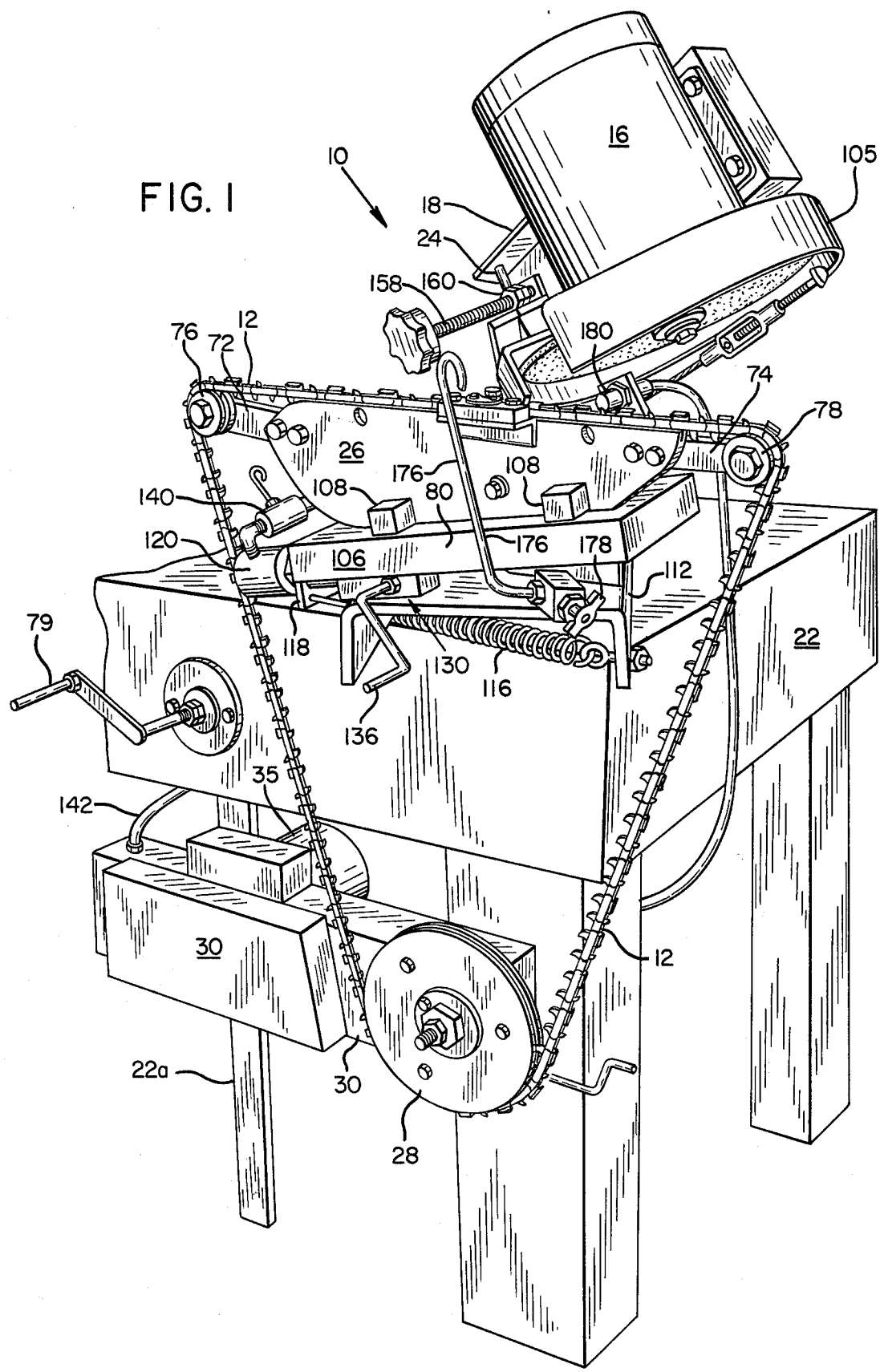
FIG. I

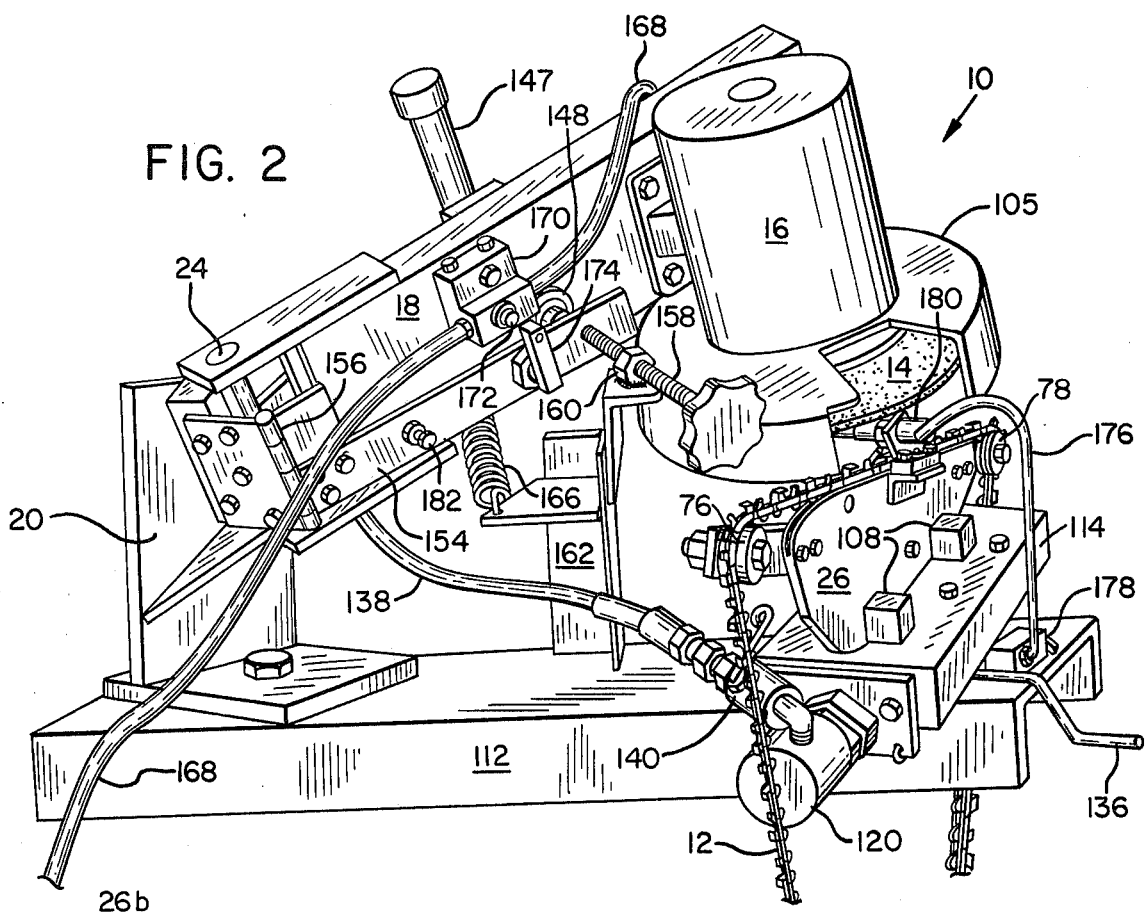

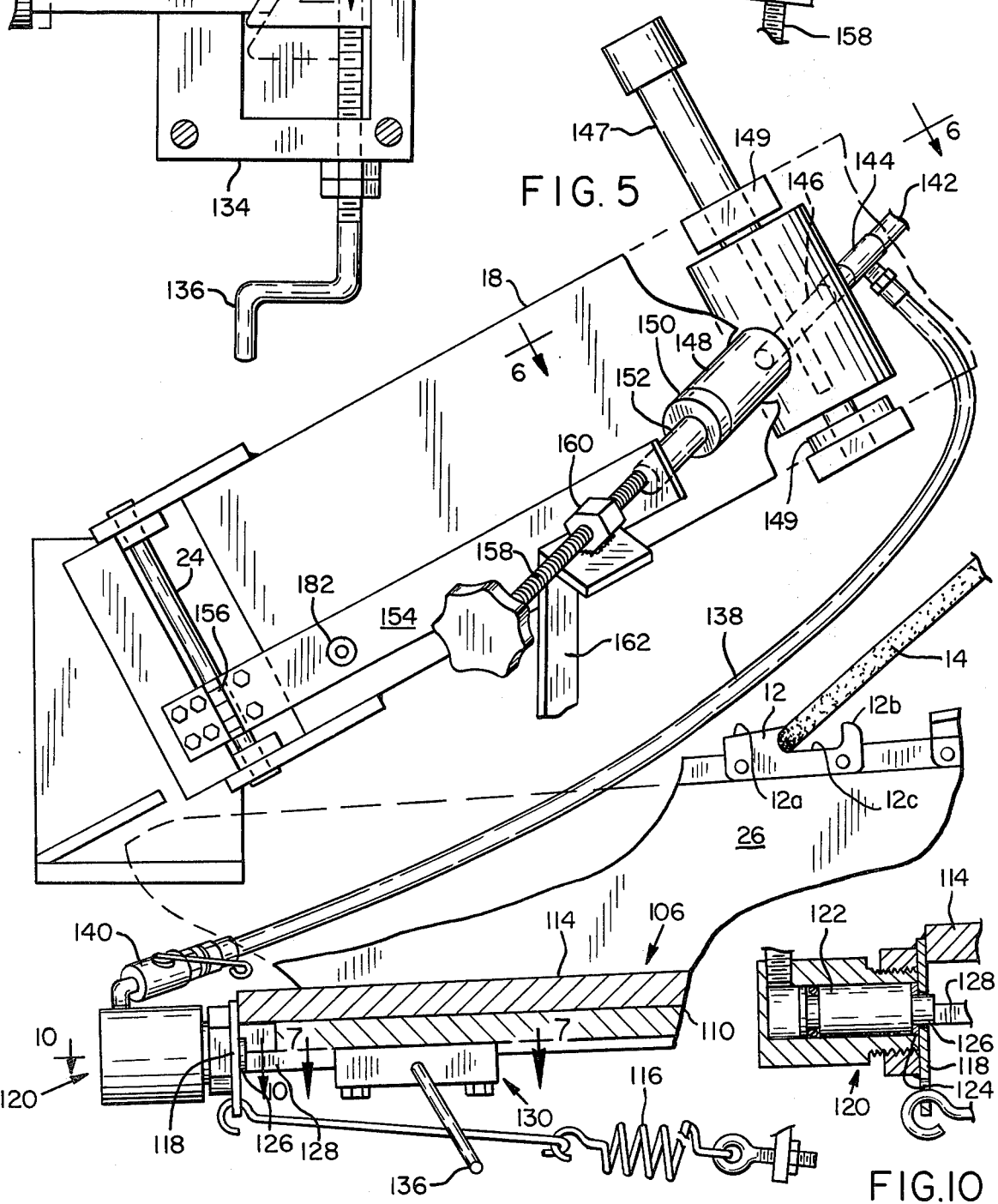

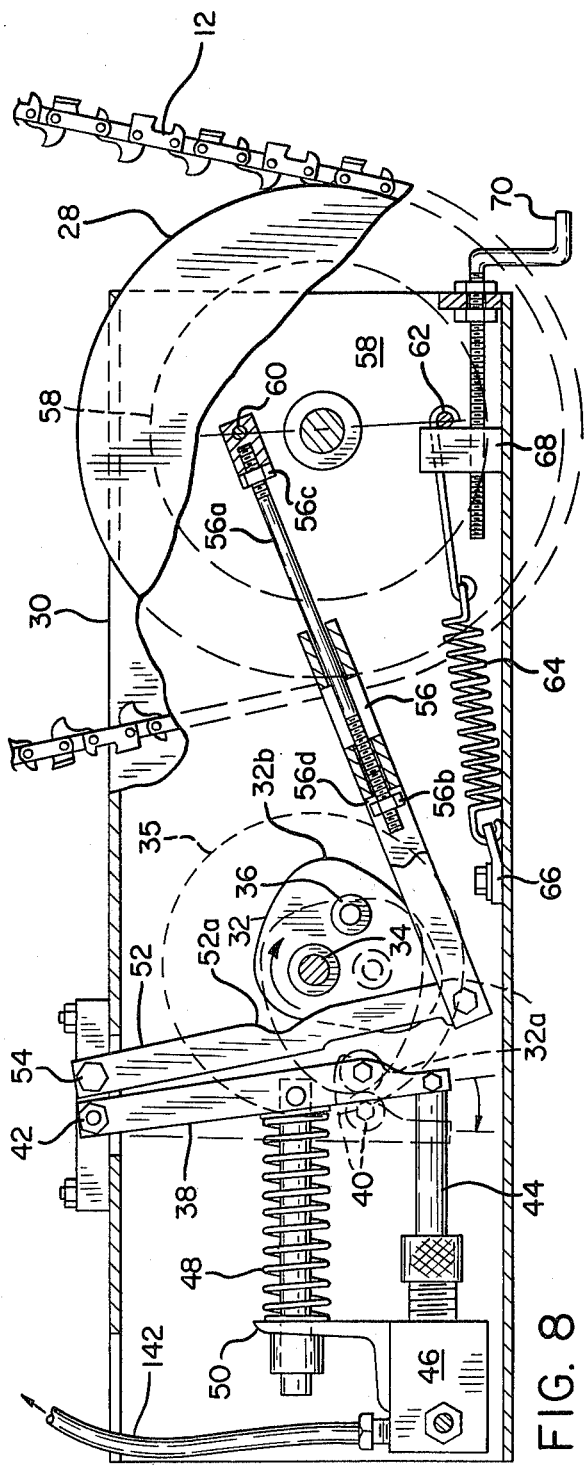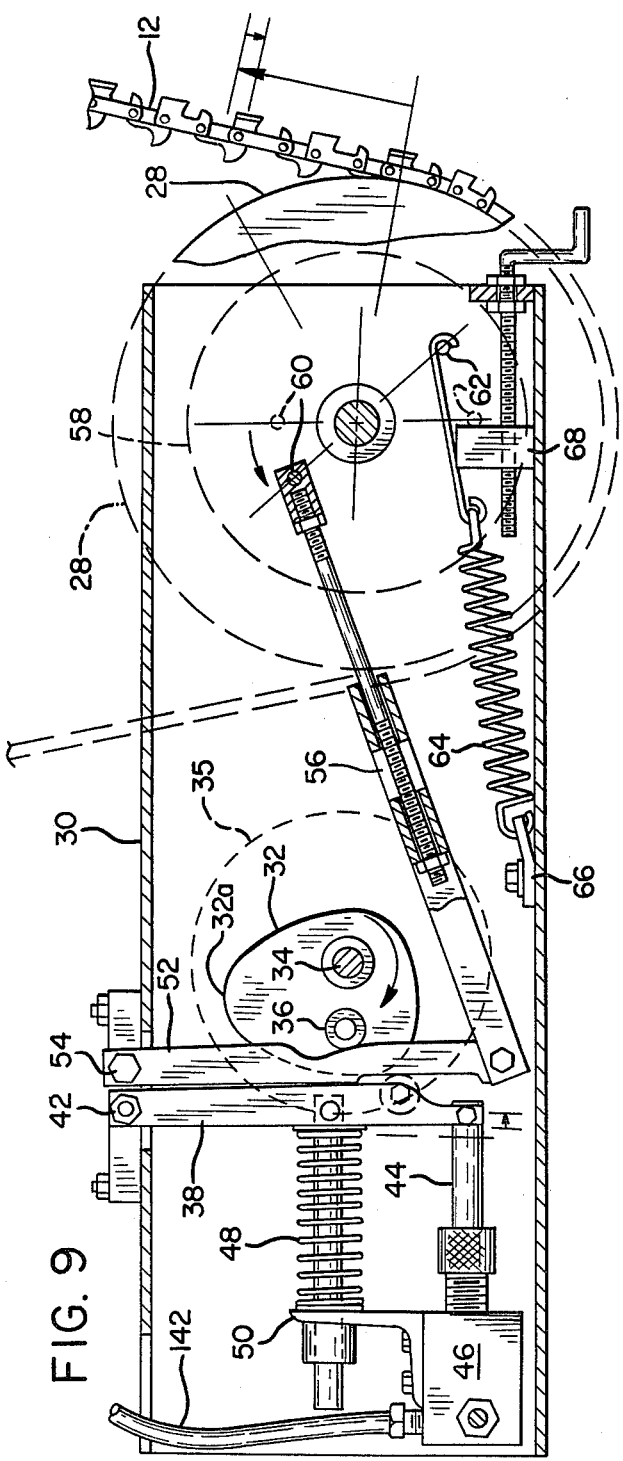

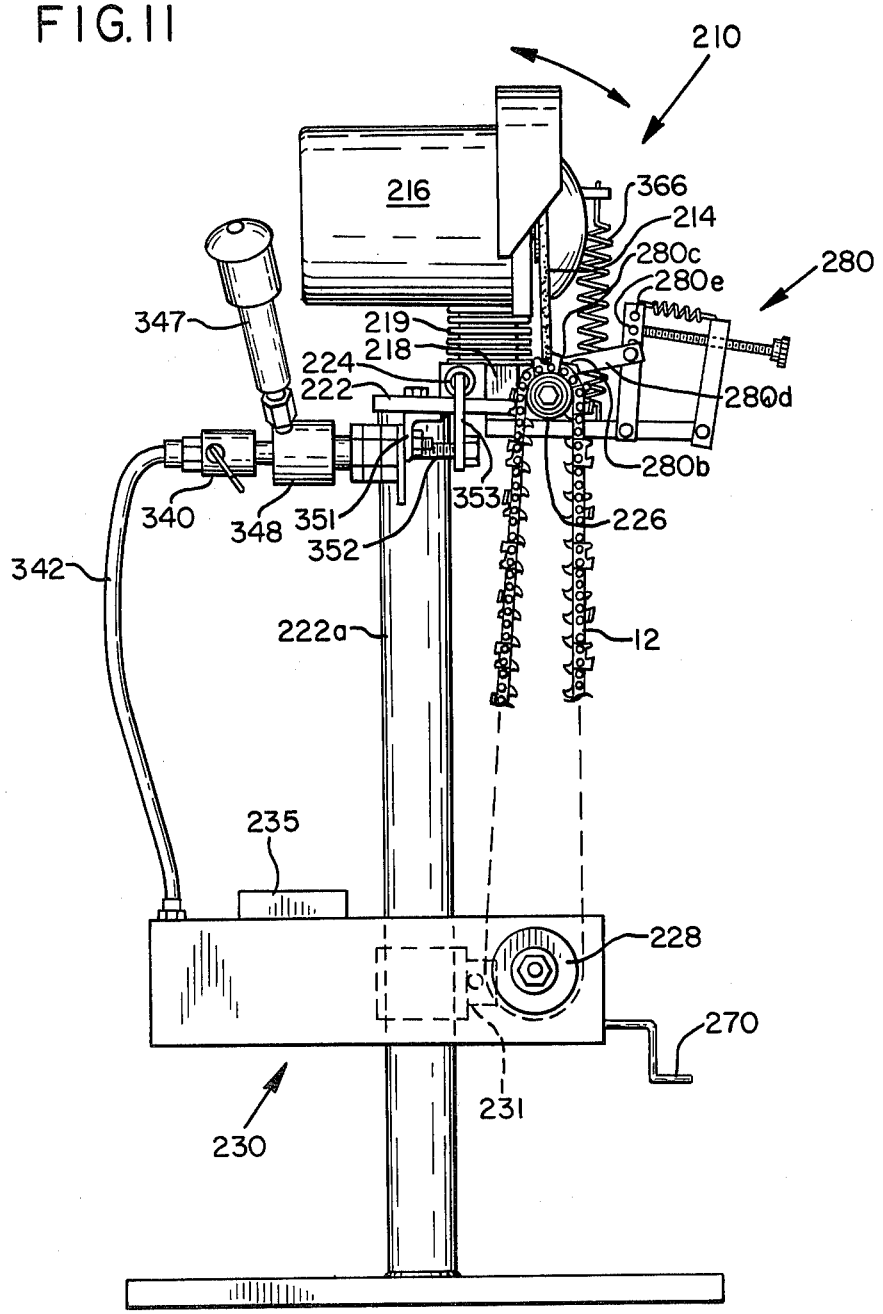

AUTOMATIC SAW CHAIN GRINDER

BACKGROUND OF THE INVENTION

This invention relates to saw chain grinders. More particularly, the invention relates to a method and machine for automatically grinding or sharpening the surfaces of cutter links of a saw chain.

Various types of saw chain grinders have been used for many years. Many of these grinders utilize a rotatably mounted grinding wheel which is adapted to be positioned adjacent the surface to be sharpened, such as that of a cutter tooth, and wherein movement of the cutter tooth into the grinding wheel is effected by manual displacement of a saw chain carriage to which the saw chain is mounted. Such machines are shown in my previous U.S. Pat. Nos. 3,349,645; 3,695,123; and 3,779,103. Alternatively, some machines oscillate the grinding wheel into the cutter tooth. See U.S. Pat. Nos. 4,104,793 and 4,044,635. While the machines disclosed in these patents may be effective in accurately sharpening individual cutter teeth of a saw chain, the sharpening process may be relatively time-consuming if all of the cutter teeth of the saw chain are to be sharpened. This is because the saw chain must be manually advanced to the next cutter tooth after each tooth is ground. Another drawback with some of the prior art grinders is that there is no guarantee that each of the cutter teeth will be sharpened in precisely the same fashion or to the same extent as the other cutter teeth of the saw chain.

There have been prior attempts to automate the grinding operation. One example is disclosed in U.S. Pat. No. 3,890,857 to Simington. This patent describes a machine in which the saw chain is intermittently indexed to move consecutive cutter teeth on one side of a saw chain into position proximate the grinding wheel for grinding thereof. More specifically, a pair of spaced saw chain holder wheels are included, one of which is rotatably mounted adjacent one end of an axially reciprocable rod which extends across the machine to opposite sides of a grinding wheel. The second holder wheel is mounted in spaced relation with the first holder wheel to permit a saw chain to be mounted to and extend between the two holder wheels. The rod is driven in an axial direction by a first motor to move the saw chain on the first holder wheel into the side edge of the grinding wheel. The rod then reverses its direction and moves that holder wheel away from the grinding wheel. The movement away from the grinding wheel actuates a switch which starts a second motor mounted in driving connection with the second holder wheel. This second motor rotates the holder wheels to advance the saw chain until the next cutter tooth contacts an abutment flange positioned adjacent the first holder wheel. Once this takes place, the rod reverses its direction and moves the first holder wheel and this next cutter tooth toward the side of the grinding wheel. The movement of the rod back toward the grinding wheel actuates a switch which stops the second motor. However, until this second motor is shut down, the second holder wheel continues to be driven by the second motor, thus resulting in slippage between the saw chain and the second holder wheel. This slippage occurs because the saw chain is held in place by the contact between the cutter tooth to be sharpened and the abutment flange. Once this second cutter tooth contacts and is sharpened by the grinding wheel, the rod reverses and the process is repeated until all the cutter teeth on one side of the saw chain are sharpened. The saw chain is then removed from the chain holder wheels on the one side of the grinding wheel and is mounted between the holder wheels on the opposite side of the grinding wheel to grind the cutter teeth on that side of the saw chain.

While Simington's machine at least theoretically provides automated means for consecutively sharpening all of the cutter teeth on a saw chain, it exhibits a number of drawbacks. First, Simington's machine necessitates the use of two separate motors in addition to the grinder motor. This not only increases the initial expense but also the operating expense to use the machine. Second, Simington depends upon a certain amount of slippage between the saw chain and his holder wheels. Such slippage not only results in a substantial waste of output of the second motor, but also requires that the saw chain be precisely fit to the holder wheels such that the requisite amount of slippage will take place only when desired, and that such slippage will occur without overloading the second motor. Another disadvantage inherent in Simington's indexing operation is that the only way that Simington provides for adjustment of the grinder to accommodate saw chains having differing pitches between the cutter teeth is to either increase or decrease the amount of slippage between the holder wheels and the saw chain. Another disadvantage of Simington's indexing operation is that it requires that his second motor be started and stopped for each cutter tooth. This type of operation naturally results in a dramatically shortened life for the motor and also results in a high degree of wear and therefore shortened life for the switches involved. Yet another drawback of this prior art machine is that there is no means provided for regulating the speed at which the cutter tooth is directed into the grinding wheel, which may sometimes be desirable in the event the cutter teeth are excessively worn or if they only have a small amount of cutting tooth remaining. One more drawback is that his grinding wheel gradually moves across the cutter tooth surface rather than grinding the entire surface at once. This may promote uneven wear of the grinding wheel. A final drawback which is, in effect, the cause of some of the aforementioned problems, is that Simington's machine requires movement of the saw chain along two planes of movement at right angles to one another. As noted above, this greatly affects the complexity of the machine and reduces its efficiency.

My U.S. Pat. No. 3,717,051 is directed to a saw chain depth gauge grinder which includes means for automatically indexing the saw chain as consecutive depth gauges are ground. In this grinder the depth gauges themselves actually act as cams to reciprocate the grinding wheel between active grinding and inactive positions. Because of the fact that the indexing of the saw chain is substantially continuous, with indexing continuing even when the grinding wheel is in a lowered, active position, this grinder is limited to use as a depth gauge grinder and is not adaptable for use in grinding other surfaces, i.e., gullets and cutter teeth.

Hence, it is a primary object of the present invention to provide an improved saw chain grinder which effectively and reliably overcomes the aforementioned drawbacks and limitations of the prior art proposals. More specifically, the present invention has as its objects one or more of the following taken individually or in combination:

(1) The provision of an automatic saw chain grinder and a method for grinding saw chains which necessitates the use of only a single motor in addition to the grinding wheel motor, and which is operable with a minimum of wasted movements and power requirements, and which therefore exhibits low initial and operating costs;

(2) To provide an automatic saw chain grinder wherein the amount of cutter tooth which is ground off is easily adjustable, and which will provide for the same amount of grinding taking place on each of the cutter teeth of a saw chain;

(3) To develop a saw chain grinder which is highly versatile in that it may be used with various types of saw chains (e.g., chipper and chisel types), and for the different cutter link surfaces of those saw chains (i.e., depth gauges, gullets, and cutter teeth), and which may be used with saw chains of widely varying pitch;

(4) The development of a grinder in which the entire cutter tooth is ground at the same time, thereby not only increasing the efficiency of the grinding operation but also reducing wear to the grinding wheel;

(5) The provision of a saw chain grinder wherein the cutter tooth being ground is securely held in place during the grinding operation, thereby increasing the precision thereof; and (6) The development of an automatic saw chain grinder in which indexing of the saw chain only occurs when the grinding which is in a raised, inactive position, thereby not only facilitating the aforedescribed versatility, but also increasing the accuracy of grinding operations while reducing the potentially debilitating wear to the saw chain inherent in some of the prior art proposals.

SUMMARY OF THE INVENTION

This invention responds to the problems presented in the prior art by providing a machine for automatically grinding one of the surfaces of a saw chain cutter link, such as the depth gauge, gullet, or cutter tooth. The machine includes the following: (1) a rotatably mounted grinding wheel having a grinding edge for grinding one of such surfaces of consecutive cutter links; (2) saw chain carriage means for supporting the saw chain for indexing movement thereon, wherein the saw chain extends along a given path; (3) oscillating means for oscillating the grinding wheel between an inactive position in which it is remote from the saw chain supported on the carriage means, and an active position in which it is proximate the saw chain; (4) automatic saw chain indexing means for intermittently indexing the saw chain along the carriage means when the grinding wheel is in an inactive position to facilitate consecutive sharpening of the cutter link surface; (5) sequencing means for sequencing operation of the indexing means and the oscillating means so that the saw chain is indexed only when the grinding wheel is in an inactive position; and (6) means for effecting relative movement between the grinding wheel and the saw chain when the grinding wheel is in the active position to cause the grinding wheel to contact and thereby sharpen the cutter link surface, the relative movement being in a direction which is substantially parallel to the given path.

The means for effecting relative movement normally comprise means for reciprocating the carriage means with respect to the grinding wheel, although the machine may be designed so that the grinding wheel is displaced into the cutter link surface to be ground.

According to one aspect of the invention, there are two sequencing means. A first sequencing means controls sequential movement of the grinding means and saw chain carriage means so that the grinding means moves to a grinding position before the carriage means moves a saw chain cutter link into grinding position and so that the carriage means retracts the cutter link from the grinding position before the grinding means retracts from such position. The second sequencing means controls sequential operation of the indexing means and first sequencing means so that a cutter link is indexed on a saw chain support portion of the carriage before the first sequencing means operates to move the grinding means to its grinding position.

BRIEF DESCRIPTION OF THE DRAWINGS

FIG. 1 is a perspective view of a first embodiment of the present invention;

FIG. 2 is a fragmentary perspective view of the embodiment of FIG. 1, shown from a different angle;

FIG. 3 is a fragmentary perspective view of the embodiment of FIG. 1, depicting the saw chain support hold-down and chain stop assemblies;

FIG. 4 is a sectional view taken along line 4—4 of FIG. 3, depicting a cutter tooth in position against the anvil with the hold-down in its active position;

FIG. 5 is a fragmentary perspective, which has been partially sectioned to better illustrate the carriage means;

FIG. 6 is a sectional view taken along line 6—6 of FIG. 5;

FIG. 7 is a sectional view taken along line 7—7 of FIG. 5;

FIG. 8 is an enlarged elevational view, partly in section, of the timing box portion of the apparatus of FIG. 1, depicting the timing means in a first operating position;

FIG. 9 is a view similar to that of FIG. 8, depicting the timing means in a second operating position;

FIG. 10 is a sectional view taken along the line 10—10 of FIG. 5.

FIG. 11 is an elevational view of a second embodiment of the present invention.

DETAILED DESCRIPTION OF THE PREFERRED EMBODIMENTS

Embodiments of FIGS. 1-10

In that form of the invention chosen for purposes of illustration in FIGS. 1-9, the automatic saw chain grinder is generally indicated with the numeral 10. The grinder 10 is designed to receive and sharpen left or right facing cutter teeth of chipper or chisel type saw chains. A second grinder (not shown) would be associated with grinder 10 to grind the cutter teeth which face in the opposite (left or right) direction.

A chisel type saw chain is depicted in the figures at 12. By way of background, it should be appreciated that conventional saw chains 12 include a plurality of spaced cutter links. The cutting of the wood is actually performed by cutting teeth 12a. A depth gauge 12b is provided forwardly of each cutter tooth in order to control the amount of penetration or cutting performed by each cutter tooth 12a. A gullet 12c is defined between each cutter tooth 12a and depth gauge 12b. The saw chain also includes spaced guide elements 12d which extend inwardly or downwardly to guide the saw chain as it passes through the track in a conventional chain saw.

The actual grinding of the saw chain 12 is performed by an abrasive, rotatably mounted grinding wheel 14, which is driven by a grinder motor 16. As shown best in FIGS. 1 and 2, the axis of rotation of grinding wheel 14 extends at an oblique angle for reasons which will become evident hereinbelow and which are well known in the prior art (see my U.S. Pat. No. Re 28, 057). Grinding wheel 14 and grinder motor 16 are mounted to a grinder support arm 18 which is pivotally or oscillatably mounted to an extension 20 of stand 22 by a pivot pin 24 shown best in FIG. 2. This pivotal mounting permits grinding wheel 14 to be oscillated between an inactive position in which it is remote from the saw chain 12, and an active position proximate the saw chain. The actual oscillation of grinding wheel 14 normally involves a range of only one and a half inches or so, although it obviously may be more or less depending upon the precise structure of the particular grinder and the saw chain which is being sharpened.

When a saw chain 12 is mounted to the grinder 10, the saw chain defines a generally triangular configuration as shown in FIG. 1. Adjacent the grinding wheel 14, the saw chain 12 passes over a linear saw chain support 26. In order to advance consecutive cutter teeth along support 26 into position proximate grinding wheel 14, indexing means are provided. These means include a pulley wheel 28 which, through a mechanism to be described hereinbelow, incrementally advances the saw chain through its grinding operations.

Now that the basic components of grinder 10 have been described, a more detailed description will be rendered. As noted above, grinder support arm 18 is adapted to oscillate grinder motor 16 and grinding wheel 14 between active and inactive positions. This oscillation may be performed by any conventional means through the use of hydraulics, pneumatics or through the use of various mechanical arrangements, such as cables, gears, or the like. The depicted embodiment is hydraulically operated through the use of a mechanical cam assembly disposed in a timing box 30 positioned adjacent a chain wheel means comprising pulley wheel 28. The operation of this mechanism correlates the saw chain indexing operations performed by pulley wheel 28 with the oscillation of grinding wheel 14 between active and inactive positions.

The mechanism included in timing box 30 is depicted in FIGS. 8 and 9 and will be briefly described at this time. A detailed description of the operation of these components will be rendered later once a description of the structure of grinder 10 is completed. The central component of the timing mechanism is a timing cam 32 which is eccentrically mounted to a drive shaft 34 which extends from a drive motor 35. Timing cam 32 includes a primary lobe 32a and a secondary lobe 32b. An extension cam 36 extends in an axial direction from the side face of timing cam 32. Extension cam 36 typically comprises a rotatably mounted bushing, thus providing its own friction reducing following mechanism. The primary lobe 32a of timing cam 32 is adapted to contact a carriage retraction actuation arm 38 at its follower 40 (see phantomed position of timing cam 32 in FIG. 8). Carriage retraction actuation arm 38 is pivotally mounted to timing box 30 at 42. The pivoting end of carriage retraction actuation arm 38 is mounted to a hydraulic pump rod 44 which extends into a piston type hydraulic pump 46 also mounted within timing box 30. A pump return spring 48 is mounted between an arm 50 which extends from hydraulic pump 46, and carriage retraction actuation arm 38. Pump return spring 48 ensures that pump rod 44 will return to its original position unless timing cam 32 is exerting force on it through carriage retraction actuation arm 38.

Extension cam 36 extends forwardly toward the viewer looking at FIGS. 8 and 9 to thereby contact an indexing actuation arm 52 which is pivotally mounted to timing box 30 at 54, forwardly of timing cam 32 and carriage retraction actuation arm 38. Indexing actuation arm 52 includes a dwell 52a adjacent its midportion, the purpose of which will be described in the "Operation" section of this description.

The pivoting end of indexing actuation arm 52 is mounted to a reciprocating rod means comprising linking arm 56, the opposite end of which is mounted to a friction drive clutch 58. Friction drive clutch 58 is mounted coaxially with pulley wheel 28 such that these components normally rotate with one another unless a predetermined friction resistance between them is overcome, at which point relative rotation is permitted. In the depicted embodiment, linking arm 56 includes length adjustment means including a centrally disposed adjustment member 56a with adjustment nuts 56b and 56c adjacent each end. Adjustment nut 56b permits the provision of a space such as that depicted at 56d which permits a certain amount or lost motion of free movement of indexing actuation arm 52 before rotational force will be imparted to friction drive clutch 58. Adjustment nut 56c permits the effective length of linking arm 56 to be adjusted which will thereby affect the position of friction drive clutch 58 once rotational force has been imposed on it by indexing actuation arm 52. Linking arm 56 is typically mounted to friction drive clutch 58 by an axially extending linking arm mounting pin 60. A second axially extending pin 62 is disposed 180° away from linking arm mounting pin 60 on friction drive clutch 58. Pin 62 is referred to as a clutch spring mounting pin since it mounts clutch return spring 64 to friction drive clutch 58. The opposite end of clutch return spring 64 is affixed to timing box 30 at 66. Clutch return spring 64 thus imposes a force on friction drive clutch 58 in a clockwise direction as depicted, which, through linking arm 56, causes indexing actuation arm 52 to follow extension cam 36.

A pitch adjustment block 68 is slidably mounted to the base of timing box 30 adjacent clutch spring mounting pin 62 to prevent friction drive clutch 58 from rotating in a clockwise direction beyond a predetermined point, as will be described in detail in the "Operation" discussion. Pitch adjustment block 68 threadably receives a saw chain pitch adjustment lever 70 so that rotation of the pitch adjustment lever controls the position of pitch adjustment block 68.

It should be appreciated that conventional timing means may be used in place of the cam-type mechanism described above. For example, electronic or hydraulic timing means, or a combination thereof, may be used. Thus, it may be desirable in some applications to include an electronically-controlled hydraulic actuation cylinder (not shown) which could not only control the operation of the pulley wheel, but would also regulate pressure output from the timing mechanism (in association with or in place of the hydraulic pump).

As shown in FIG. 3, saw chain support 26 includes, in cross section, a centrally disposed support groove 26a straddled by support rails 26b. The support groove 26a is adapted to receive the inwardly or downwardly extending saw chain guide elements 12d.

First and second saw chain support extension arms 72 and 74 extend outwardly from the ends of saw chain support 26. Each support extension arm 72 and 74 includes a guide wheel 76 and 78, respectively, adjacent its end. These guide wheels 76 and 78 are grooved like saw chain support 26 so that they also are adapted to receive the saw chain guide elements 12a. These support extension arms 72 and 74 and their guide wheels 76 and 78 are desirable in order to minimize resistance to the indexing of saw chain 12 as the various saw chain cutter teeth 12b are sharpened. Means may be provided for adjusting the position of guide wheels 76 and 78 on their respective support extension arms 72 and 74 in order to adapt grinder 10 to receive saw chains of widely varying lengths.

Regardless whether or not adjustable guide wheels are included, it is desirable that a saw chain mounting crank 79 be provided to simplify the mounting of the saw chain 12 to the grinder 10. Mounting crank 79, shown in FIG. 1, extends through stand 22 to a winch (not shown). A cable (not shown) extends downwardly from the winch to timing box 32 which is suspended from that cable, and which is slidingly mounted to leg 22a of stand 22. This maintains the saw chain 12 under tension, but permits pulley wheel 28 to be raised to relieve this tension to permit removal thereof. This also adapts the grinder 10 to handle saw chains of widely varying lengths.

As shown best in FIGS. 3 and 4, a chain stop 80 and a chain hold-down arm 82 contact the saw chain link which is being sharpened. Chain stop 80 is mounted to a chain stop mounting block 84 by a mounting bolt 86. Chain stop mounting block 84 includes an anvil 84a which extends toward the saw chain 12. As shown in FIG. 4, hold-down arm 82 imposes downward and lateral force on the saw chain link being sharpened. This forces the cutter tooth 12a into anvil 84a, which holds the cutter tooth in an upright position for grinding.

Chain stop 80 is biased in a clockwise direction about mounting bolt 86 by a chain stop spring 88, and includes an aperture 80a which receives a mounting block extension pin 90. This pin 90 limits the rotation of chain stop 80 about mounting bolt 86. Chain stop 80 also includes an inclined side face 80b and an abutment side face 80c. As will be described in detail below, these faces are intended to permit the indexing of a saw chain link cutter tooth 12a and depth gauge 12b on saw chain support 26 toward the right in FIG. 3, but limit movement to the left.

Chain hold-down arm 82 is mounted to a hold-down mounting shaft 92 which is rotatably mounted in a hold-down mounting block 94. A mounting shaft extension arm 96 extends from mounting shaft 92 and is affixed to a cable 98 by a mounting screw 100. Cable 98 extends through a cable pulley 104 to a grinder shield 105 which surrounds grinding wheel 14. A mounting shaft spring 102 is positioned on mounting shaft 92 to bias hold-down arm 82 in a downwardly direction. Thus, unless cable 98 exerts a downward force on mounting shaft extension arm 96, hold-down arm 82 will be maintained in its lowered or active position (depicted in FIG. 4). When downward force is exerted by cable 98, hold-down arm will be pivoted upwardly, thereby releasing the saw chain for indexing movement on saw chain support 26.

Saw chain support 26 is rigidly mounted to a saw chain support carriage 106 by mounting blocks 108. Saw chain support 26 and saw chain support carriage 106 cooperate to dispose saw chain 12 at an incline of 10° with respect to horizontal in the depicted embodiment in order to adapt that grinder 10 for use with chisel type saw chains. This is desirable and has been included in prior art designs to accommodate for the typical 3° to 9° clearance angle on chisel type cutting teeth. As shown best in FIG. 5, support carriage 106 includes a stationary base 110 which is rigidly mounted to stand 22 by a support bracket 112 (FIGS. 1 and 2). Support carriage 106 also includes a slide member 114 which is permitted to laterally reciprocate with respect to stationary base 110. Slide member 114 is biased in a rightward direction (FIG. 5) by a slide spring 116 which extends from a mounting plate 118 affixed to slide member 114, to support bracket 112. Slide member 114 is affixed to the underside of saw chain mounting blocks 108 (FIG. 2) so that movement of slide member 114 will result in movement of saw chain support 26 and the saw chain 12 thereon. It should be noted that the movement of the saw chain 12 with support 26 will be possible even if pulley wheel 28 is fixed in position, because the entire saw chain support/support carriage assembly, including extension arms 72 and 74 and guide wheels 76 and 78, will be moving.

A single acting hydraulically operated carriage drive cylinder 120 is positioned adjacent one end of slide member 114 and is designed to control the reciprocation of slide member 114 with respect to stationary base 110. Carriage drive cylinder 120 is affixed to mounting plate 118 and includes a piston 122 and a shim 124 (FIG. 10). A piston rod 126 extends from carriage drive cylinder piston 122. Piston rod 126 passes through an aperture in mounting plate 118 to contact an adjustment bar 128 which extends into a carriage adjustment 130 (FIG. 5) which is rigidly affixed to stationary base 110. Thus, reciprocation of carriage drive cylinder 120 relative to piston 122 will result in the reciprocation of slide member 114 with respect to stationary base 110.

As shown in FIG. 7, carriage adjustment 130 includes a wedge 132 which is slidably mounted with respect to both a carriage adjustment casing 134 and adjustment bar 128. Wedge 132 is threadably engaged by carriage adjustment lever 136 so that rotation of the carriage adjustment lever will result in movement of wedge 132 within casing 134, thereby resulting in movement to the left or right (FIG. 7) of adjustment bar 128. This movement is opposed by carriage slide spring 116 which maintains adjustment bar 128 in constant contact with wedge 132. In this fashion the carriage adjustment may be used to precisely adjust the position of saw chain support 26 with respect to stationary base 110 and therefore grinding wheel 14. To provide an additional adjustment, shim 124 may be replaced with another shim of greater or lesser thickness.

Hydraulic pressure is provided to carriage drive cylinder 120 by carriage drive hydraulic line 138. A flow restriction valve 140 is included in carriage drive hydraulic line 138 in order to permit the regulation of hydraulic fluid flow out of carriage drive cylinder 120 and therefore to regulate the speed at which slide member 114 and saw chain support 26 travel to the right in FIGS. 5 and 10. Carriage drive hydraulic line 138 is interconnected with a main hydraulic line 142, which extends from hydraulic pump 46, via a tee connection 144. Therefore, it can be seen that hydraulic pump 46 controls the movement of saw chain support 26 and the saw chain 12 carried thereon.

The opposite leg of tee connection 144 interconnects main hydraulic line 142 with a support arm hydraulic line 146 which, in conjunction with a single-acting support arm control cylinder 148, controls the oscillation of grinder support arm 18. An oil filler and reservoir 147 is included in this circuit as shown in FIG. 5 and FIG. 6. Control cylinder 148 includes a plunger 150 to which is mounted a plunger or piston rod 152. The end of plunger rod 152 which is remote from plunger 150 contacts a backstop bar 154 which is pivotally mounted to extension 20 by a backstop bar hinge 156. As shown in FIGS. 5 and 6, support arm control cylinder 148 is rotatably mounted to support arm 18 by bushings 149. Therefore, movement of plunger 150 within support arm control cylinder 148 will result in relative pivotal movement between grinder support arm 18 and backstop bar 154. Because backstop bar 154 is stationary with respect to stand 22, such movement of support arm 18 and grinding wheel 14 mounted thereto will result in relative movement between grinding wheel 14 and the saw chain 12 positioned on saw chain support 26.

Backstop bar adjustment member 158 is provided to vary the position of backstop bar 154 and therefore grinder support arm 18 with respect to the stationary components of the grinder 10. Backstop bar adjustment member 158 is threaded into a mounting nut 160 which is affixed to a stationary mounting bracket 162 extending upwardly from stand 22. A support arm resistance spring 166 also extends between mounting bracket 162 and support arm 18 to bias the support arm and grinding wheel 14 mounted thereto into its active position disposed proximate the saw chain 12.

As shown in FIG. 2, a coolant line 168 is provided to convey coolant, such as air, water, or oil, to grinding wheel 14. This coolant would normally be imparted to the grinding wheel adjacent the saw chain 12 where most of the heating would be taking place. The coolant line 168 passes through a coolant valve 170 mounted to grinder support arm 18. Coolant valve 170 includes a coolant switch 172 which controls the operation of coolant valve 170. A coolant switch abutment member 174 extends upwardly from backstop bar 154 to contact coolant switch 172 when support arm 18 is in a lowered position. The desirability of control valve 170 will be appreciated when the operation of grinder 10 is discussed below.

Coolant line 168 is interconnected with nozzle line 176 to provide cooling directly where the grinding is taking place.

Safety means are provided to shut down the grinder 10 in the event of saw chain breakage or other major casualty occurring during grinding operations. A metal detecting link sensor 180 is mounted adjacent saw chain support 26 to detect the presence of a saw chain thereon. This link sensor 180 cooperates with a safety switch 182 mounted to backstop bar 154 to shut down the main control motor in the event of problems.

Operation of Embodiment of FIGS. 1-9

In order to use grinder 10, a saw chain 12 is first mounted in place. This is done through the use of saw chain mounting crank 79 which is used to crank timing box 30 upwardly along leg 22a of stand 22. The saw chain 12 may then be mounted to saw chain support 26 and guide wheels 76 and 78, with guide elements 12d of the saw chain fitting into support groove 26a. Crank 79 is then used to lower timing box 30 until pulley wheel 28 engages the saw chain.

Once the saw chain 12 is in place, the grinder 10 is ready for operation. Grinder motor 16 and drive motor 35 are then energized in that order. Drive motor 35 rotates timing cam 32 so that from its initial position shown in solid lines in FIG. 8, the timing cam rotates in a clockwise direction to the position depicted in phantom in that figure. The phantomed position also shows that carriage retraction actuation arm 38 has been pivoted, thus comressing pump return spring 48 and displacing hydraulic pump rod 44 toward hydraulic pump 46. This forces hydraulic fluid through main hydraulic line 142 and, via tee connection 144, to support arm hydraulic line 146 and carriage drive hydraulic line 138. The combination of the weight of the support arm/grinder motor assembly and the tension from support arm resistance spring 166 is greater than the resistance provided by slide spring 116. Therefore, the increased pressure from main hydraulic line 142 will first result in the compression of carriage drive cylinder shim 124, and thereafter cause carriage drive cylinder 120 to be displaced to the left as shown in FIGS. 5 and 10. Since the carriage drive cylinder 120 is affixed to mounting plate 118 and slide member 114, displacement of carriage drive cylinder 120 will result in slide member 114 being shifted to the left with respect to stationary base 110. These components are normally designed to permit only 0.030 inch of movement of the slide member. This movement results in the cutter tooth 12a being retracted from grinding wheel 14, which, due to its weight and support arm resistance spring 166, is in its lowered, active position. Once slide member 114 has been displaced 0.030 inch, the hydraulic pressure from main hydraulic line 142 and support arm hydraulic line 146 forces cylinder 148 upwardly relative to plunger 150 (to the position depicted in FIG. 6), which causes plunger rod 152 to exert a downward force on backstop bar 154. Since support arm control cylinder 148 is mounted to support arm 18, this pressure on backstop bar 154 causes support arm 18 to be pivoted upwardly with respect to backstop bar 154. This shifts grinding wheel 14 from its active position to an inactive position remote from the saw chain 12. The upward movement of grinding wheel 14 and grinding shield 105 exerts an upward force on cable 98 (FIGS. 3 and 4) mounted thereto which, through cable pulley 104, causes hold-down mounting shaft 92 to rotate against the force of mounting shaft spring 102, thereby raising hold-down arm 82 to the position depicted in phantom in FIG. 4.

When grinder support arm 18 is most of the way to its raised position, extension cam roller 36 on timing cam 32 begins to contact indexing actuation arm 52. This pivots indexing actuation arm 52 to the left, thereby shifting reciprocating rod means 56 to the left and rotating friction drive clutch 58 in a counterclockwise direction as shown in FIG. 9. The friction mounting between friction drive clutch 58 and pulley wheel 28 causes pulley wheel 28 to rotate in the same direction. This results in the indexing of the saw chain 12 forwardly along saw chain support 26 (the chain actually moving backward in a rightward direction in FIG. 3). The rear edge of cutter tooth 12a acts upon inclined face 80b of chain stop 80, thereby rotating the chain stop in a counterclockwise direction against the action of chain stop spring 88. This is unlike some of the prior art proposals where the cutting edge of the cutter tooth actually performs various camming functions. Once both the cutter tooth 12a and the depth gauge 12b have passed chain stop 80, the chain stop springs back to its original position.

By this time, extension cam 36 has reached the dwell 52a in indexing actuation arm 52. The tension of clutch return spring 64 causes friction drive clutch 58 to shift back to its original position 60 (shown in phantom in FIG. 9). The friction between friction drive clutch 58 and pulley wheel 28 also begins to rotate pulley wheel 28 in a clockwise direction, causing the saw chain to shift rearwardly (in a leftward direction in FIG. 3). This movement of pulley wheel 28 and the saw chain 12 is permitted only until the depth gauge 12b contacts abutment face 80c on chain stop 80. Once this happens, the saw chain 12 can move no further in that direction. Thus, the resistance to the rotation of pulley wheel 28 is greater than the friction connection between pulley wheel 28 and friction drive clutch 58, which results in slippage between these two members permiting the clutch to return to its original position, ready for the next indexing cycle.

By the time the saw chain depth gauge 12b is shifted rearwardly into contact with abutment face 80c, secondary lobe 32b is beginning to clear carriage retraction actuation arm 38 and its follower 40. This causes hydraulic pump rod 44 to be retracted from hydraulic pump 46, thereby decreasing the hydraulic pressure in main hydraulic line 142. For the same reason that grinder support arm 18 was the last to be affected by an increase in hydraulic pressure in this line, it is the first to react to a decrease in this pressure. Thus, plunger 150 is retracted relative to support arm control cylinder 148 under the influence of spring 166, thereby lowering support arm 18 and moving grinding wheel 14 into its active position disposed in the gullet 12c between the depth gauge 12b and the cutter tooth 12a.

Once grinder support arm 18 reaches its lowered position the reduction in pressure in main hydraulic line 142 acts through carriage drive hydraulic line 138 to retract piston 122 in carriage drive cylinder 120, thereby permitting slide spring 116 to move slide member 114, saw chain support 126 and saw chain 12 carried thereon to the right as shown in FIG. 5 and to the left as shown in FIG. 3. This shift of the chain support 0.030 inches moves the cutter tooth 12a into contact with grinding wheel 14, thereby grinding the cutter tooth face.

Since the cutter tooth 12a is moving directly toward the axis of rotation of grinding wheel 14, the entire face of the tooth will be simultaneously ground. This is preferable to the design of some of the prior art grinders (e.g. Simington's aforementioned design) in which the grinding wheel moves across the face of the cutter tooth. This feature of the present design is desirable for two reasons. First, it retards wear of the grinding wheel because the entire peripheral surface of the grinding wheel is utilized rather than only a portion thereof. Second, the position of the grinding wheel need not be adjusted as often to account for wear.

During the grinding operation, it should be remembered that anvil 84a hold-down arm 82, and chain stop 80 all cooperate to hold cutter tooth 12a in place; that is, there is no movement with respect to the saw chain 12 and saw chain support 26. All the movement is taking place between saw chain support carriage 106 and stand 22 (with which grinding wheel 14 is now in a fixed relation).

This feature contributes to the accurate grinding of the cutting angles desired and to uniform cutting angles on the different cutting teeth, resulting in a smooth, straight-cutting chain.

By the time the grinding is completed, primary lobe 32a of timing cam 32 is beginning to contact follower 40 on carriage retraction actuation arm 38. As described above, this increases the pressure in main hydraulic line 142, thus causing retraction of the carriage and cutter tooth 12a from grinding wheel 14 which results from movement of saw chain support carriage 106, and the process is repeated.

During normal operation of the grinder 10, safety switch 182 and link sensor 180 cooperate to keep power flowing to timing motor 35. As shown in FIG. 2, safety switch 182 is mounted to backstop bar 154. It extends through the backstop bar so that when grinder support arm 18 is in a raised position with respect to backstop 154, safety switch 182 will be out of contact with support arm 18 and will be in its normal, closed position, thus permitting electricity to flow to the timing motor 35. When support arm 18 reaches its lowered position, it contacts safety switch 182, thereby cutting power to timing motor 35 unless a saw chain link is sensed by link sensor 180. If a link is in position adjacent link sensor 180, the flow of electricity will continue. Thus, in the event of chain breakage or other serious casualty which could result in displacement of the saw chain from its normal position, the grinder 10 will automatically be shut down.

As mentioned above, the grinder 10 is highly versatile in that it is adapted for use with saw chains of different types and of widely varying dimensions. Many simple adjustments may be made to the various components of the grinder 10, and this is one reason why it is so versatile. The operation of these adjustable components will now be discussed.

The position of grinding wheel 14 with respect to the saw chain 12 may be varied through the use of backstop bar adjustment member 158 which permits variation of the distance between adjustment member nut 160 and backstop bar 154. This, in turn, permits regulation of the active position of grinding wheel 14.

As noted above, carriage adjustment 130 permits precise regulation of the lateral reciprocation of slide member 114 and saw chain support 26 mounted thereto. While the extent of lateral reciprocation remains relatively constant at 0.030 inch because of the constant stroke of cylinder 120, the initial and final positions of this shift are adjustable through the use of carriage adjustment crank 136 which is threaded through wedge 132. Therefore, through the use of this lever, the amount of grinding taking place during the 0.030 inch shift may be regulated. For example, if carriage adjustment lever is rotated in a clockwise direction as seen in FIG. 5, wedge 132 will move downwardly as shown in phantom in FIG. 7. Slide spring 116 is then permitted to shift adjustment bar 128 to the right, thus moving the saw chain cutter tooth 12a toward grinding wheel 14. After this adjustment, grinding will take place during a greater portion of the 0.030 inch than previously was the case. If adjustment is made in the opposite direction, a lesser amount of grinding will take place during the 0.030 inch shift. This adjustment is usually made, if at all, only once for each saw chain since it is normally desirable that each cutter tooth on a particular saw chain be ground to the same extent as the others.

The flow restriction valve 140 is included in carriage drive hydraulic line 138 to permit the rate of flow of hydraulic fluid through that line to be regulated. Thus, if flow restriction valve 140 exerts a substantial restriction upon the flow of fluid from carriage drive cylinder 120, the resulting lateral shifting of slide member 114 and saw chain support 26 will be relatively slow. This may be desirable when the cutting teeth of a particular saw chain are badly worn or if only a small amount of cutting tooth is left on the links of that saw chain. In the event that flow restriction valve 140 exerts little or no restriction upon the flow of fluid through carriage drive hydraulic line 138, the grinding will take place at a rapid rate.

Pitch adjustment block 68 in FIGS. 8 and 9, as the name implies, permits the grinder 10 to be adjusted to grind saw chains having different pitches ("pitch" being defined as the longitudinal distance between the cutting teeth). The position of pitch adjustment block 68 determines the initial position of friction drive clutch 58 due to the abutment of clutch spring mounting pin 62 with the pitch adjustment block. As noted above, clutch return spring 64 maintains these members in contact until displacement of friction drive clutch 58 is initiated by the timing cam mechanism. For example, if pitch adjustment block 68 is shifted leftwardly by the rotation of pitch adjustment lever 70, clutch spring mounting pin 62 will initially take a position which is to the left of that depicted in FIG. 8. Thus, once rotation is imparted by the timing cam mechanism, a greater amount of rotation will actually take place, thereby accommodating a saw chain having greater than normal pitch. To accommodate a saw chain of less than normal pitch, pitch adjustment block 68 is shifted in the opposite direction.

Variation of the effective length of linking arm 56 through the use of adjustment member 56a and adjustment nuts 56b and c permits variation of the final position of friction drive clutch 58, thereby also affecting the extent of advancement of the saw chain which takes place in each indexing step. Adjustments to linking arm 56 are normally not necessary during the operation of the grinder 10, since suitable adjustability is normally provided through the use of pitch adjustment lever 70 and pitch adjustment block 68 mounted thereto.

Once a particular saw chain 12 has had either all of its right or left side cutter teeth ground, drive motor 35 and grinder motor 16 can then be shut down, in that order. Crank 79 is then rotated to elevate timing box 30 and pulley wheel 28 mounted thereto. This slackens saw chain 12 and permits its removal from grinder 10. The saw chain 12 is then mounted to a second grinder (not shown) which is identical to grinder 10 except it is adapted to grind the opposite (left to right side) cutter teeth.

Grinder 10 is shown as set up to grind a saw chain having chisel type cutter teeth. The grinder may alternatively be adapted to grind the cutter teeth of a chipper saw chain by merely changing the orientation of the grinding wheel. It may also be desirable to interchange a second grinding wheel with one depicted and described above, in order to specifically adapt the machine for grinding chipper type saw chains.

Embodiment of FIG. 11

The embodiment of FIG. 11, generally identified with the numeral 210, operates on basically the same principles as grinder 10 described above, except that it is specifically adapted to grind the depth gauges 12b and gullets 12c of a saw chain 12. Therefore, only an abbreviated discussion of the structure and operation of this embodiment will be given. In order to simplify this discussion, the components have been identified with numerals which correspond to those used with grinder 10 except that the 200 series has been used to identify those components identified with numerals 10-98 of grinder 10, and the 300 series has been used to identify those components numbered 100-182; that is, the last two digits of each corresponding component will be the same. Where there is no corresponding component in grinder 10, different identification numerals will be utilized.

The grinding wheel 214 and its grinder motor 216 are disposed with their axis of rotation extending generally horizontally when the grinding wheel is in its active position. A generally vertically extending grinder support arm 218 is disposed within an accordian-like protective cover 219 due to its proximity to the grinding operations. These components are adapted to pivot on a pivot pin 224 which is rotatably mounted to a stand 222. Stand 222 is maintained in an elevated position by a single leg 222a. A support arm resistance spring 366 extends between grinder motor 216 and stand 222 to bias the grinder motor toward its active position.

A saw chain support wheel 226 is rotatably mounted to stand 222 to freely rotate and support the saw chain 12 as necessary during the indexing operations of saw chain 12. Therefore, to a certain extent it fulfills the same purpose of saw chain support 26 of grinder 10. However, it is not, itself, driven, other than by the movement of saw chain 12.

Saw chain 12 extends between support wheel 226 and a pulley wheel 228 which is mounted to a timing box 230. Timing box 230 is slidably mounted to leg 222a by a clamp 231 which may include means (not shown) for fixing its vertical position with respect to leg 222a. A drive motor 235 is mounted to timing box 230. The timing mechanism of grinder 210 is basically the same as that depicted and described above with respect to grinder 10, so has not been shown in FIG. 11 and will not be described herein. As noted above with respect to grinder 10, conventional means using pneumatics, electronics, hydraulics, or various mechanical drives may alternatively be utilized.

A main hydraulic line 342 extends upwardly from a hydraulic pump (not shown) disposed within timing box 230. Main hydraulic line 342 passes through a flow restriction valve 340 and into a support arm hydraulic cylinder 348. An oil filler and reservoir connection 347 extends upwardly and is connected with support arm control cylinder 348. Support arm control cylinder 348 includes a piston (not shown) which reciprocates within the control cylinder with changes in pressure in main hydraulic line 342. Support arm control cylinder 348 is rigidly mounted to stand 222 by a bracket 351. A piston rod 352 extends from the support arm control cylinder piston and terminates in a lever arm 353. This lever arm 353 extends upwardly to pivot pin 224.

Unlike grinder 10, a saw chain support carriage/carriage drive assembly is not included in grinder 210 for reasons which will become evident as this discussion continues.

A chain stop 280, which is of conventional design, extends from the underside of stand 222 and is designed to rigidly fix the position of the saw chain 12 when grinding operations are being performed. It includes an inclined face 280b which is adapted to permit movement of the saw chain 12 in a counterclockwise direction, and an abutment face 280c which is adapted to prevent movement in the opposite direction. These faces form the terminus of a stop arm 280d which is pivotally mounted to one of a plurality of apertures 280e in chain stop 280. By moving stop arm 280d to the various different apertures 280e, the position of abutment and inclined faces 280c and b, may be varied.

Operation of the Embodiment of FIG. 11

This discussion of the operation of grinder 210 will primarily describe its use as a gullet grinder, although it is equally suited for use as a depth gauge grinder. A short discussion of operation as a depth gauge grinder will follow subsequently.

As noted above, the operation of grinder 210 is similar to that of grinder 10 except that the carriage and its reciprocation means have been deleted. The reason for this deletion is because the grinding takes place when grinding wheel 214 pivots or oscillates downwardly from its inactive position to the depicted active position in which it contacts the saw chain 12. Therefore, there is no need for any additional relative movement between the saw chain 12 and grinding wheel 214. However, it should be understood that one way to define the operation of grinder 210 is to say that oscillating means oscillate grinding wheel 214 between an inactive position in which it is remote from the saw chain 12, and an active position in which it is proximate the saw chain. Additional relative movement between grinding wheel 214 and the saw chain 12 would actually bring the grinding wheel into contact with the saw chain, although this relative movement would merely be a continuation of the oscillation.

In order to mount the saw chain 12 to grinder 210, timing box 230 is elevated by loosening clamp 231, raising the position of timing box 230 along leg 222a, mounting the saw chain 12 between saw chain support wheel 226 and pulley wheel 228, and then lowering timing box 230 to its initial position in which the saw chain 12 is maintained in slight tension, and tightening clamp 231. Chain stop arm 280d should be positioned as depicted in FIG. 11, in one of the lower apertures 280e, with a cutter link centrally disposed on the upper surface of saw chain support wheel 226.

The initial position of grinding wheel 214 and grinder motor 216 will be shifted slightly upward and to the left, i.e., rotated in a counterclockwise direction about pivot pin 224, from the position depicted in FIG. 11. With grinding wheel thus positioned, grinder motor 216 may be started. Drive motor 235 may then also be started. If it is assumed that the timing mechanism positioned in timing box 230 is disposed such that the saw chain 12 has just been indexed, the first operation effected by the timing mechanism will be to decrease the hydraulic pressure in main hydraulic line 342. As mentioned above, this is normally performed through the use of a camming arrangement such as that described above in connection with the description of grinder 10. This decrease in pressure results in piston rod 352 being retracted into support arm control cylinder 348. This displaces lever arm 353, grinder support arm 218, grinder motor 216, and grinding wheel 214 in a clockwise direction, thus bringing grinding wheel 214 into engagement with the gullet 12c of the cutter link being ground. After a short delay in which grinding takes place, the hydraulic pressure in main hydraulic line 342 is increased, thereby projecting piston rod 352 out of support arm control cylinder 348, thus raising grinding wheel 214 to its inactive position.

The saw chain 12 is then indexed by pulley wheel 228 which is rotated by a friction drive clutch arrangement such as that described earlier. This indexing takes place in a counterclockwise direction so that inclined face 280b of chain stop 280 permits the next cutter link to move into a position slightly beyond that position depicted in FIG. 11. Pulley wheel 228 then reverses its direction until the cutter link contacts abutment face 280c, at which point pulley wheel 228 is permitted to slip with respect to the friction drive clutch (not shown). With the saw chain in this depicted position, grinding wheel 214 is lowered and the operation is repeated.

In the event that grinder 210 is to be used to grind the depth gauges 12b of the saw chain 12, the chain arm stop 280d is moved to one of the upper apertures 280e, thereby causing the cutter link to be ground to take a position slightly to the right of the position depicted in FIG. 11, so that the depth gauge 12b will be centrally positioned over saw chain support wheel 226. In other respects, the operation as a depth gauge grinder will be the same as a gullet grinder.

Like grinder 10, grinder 210 includes various adjustment means to adapt the grinder for use with various types and sizes of saw chains. As noted above, a flow restriction valve 340 is included to control the speed of movement of the grinder motor/grinding wheel assembly, and control the speed of grinding operations. Also, pitch adjustment means (such as those of grinder 10) are included, but are not depicted except for pitch adjustment lever 270. Finally, means for adjusting the effective length of grinder support arm 218 may be included (but are not depicted), to permit adjustment to accommodate for wear of grinding wheel 214.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An automatic saw chain grinder for grinding a selected surface of successive cutter links of a saw chain, comprising:
   a rotatable grinding wheel,
   mounting means mounting the grinding wheel for movement toward and away from a grinding position,
   saw chain support means for mounting a saw chain for indexing movement therealong to position successive cutter links adjacent said grinding position,
   first hydraulic pressure-operated means acting on said mounting means for controlling the movement of said grinding wheel toward and away from said grinding position,
   indexing means including a power-operated reciprocating rod means acting on a chain wheel for moving said chain along said support means to index successive cutter links for sharpening,
   and power-operated sequencing means operable to reciprocate said rod means and pressurize and depressurize said hydraulic pressure-operated means in sequence such that a first cutter link is indexed for grinding before said grinding wheel is moved to said grinding position and said grinding wheel is moved from said grinding position before a second cutter link is indexed for grinding, carriage means mounting said saw chain support means for reciprocation to move a cutter link on said support means between said grinding position and a retracted position, second hydraulic pressure-operated means acting on said carriage means for controlling said reciprocation, common hydraulic conduit means for supplying pressure fluid from a common source to said first and second pressure-operated means, and control means for controlling the operation of said first and second pressure-operated means in sequence upon operation of said sequencing means to pressurize and depressurize said common conduit means such that said grinding wheel moves to said grinding position before said support means moves an indexed cutter link to said grinding position and such that said support means moves said cutter link to said retracted position before said grinding wheel moves from said grinding position.

2. Apparatus according to claim 1 wherein said first and second pressure-operated means include first and second hydraulic cylinders, respectively, and said control means includes means for operating said cylinders in sequence.

3. Apparatus according to claim 2 wherein said hydraulic cylinders comprise single-acting hydraulic cylinders and said means for operating said cylinders in sequence comprise biasing means acting in opposition to hydraulic pressure applied to said cylinders.

4. Apparatus according to claim 1 including flow restrictor means in said hydraulic conduit operable to control the speed of movement of said carriage means.

5. Apparatus according to claim 3 wherein said biasing means comprise first spring means biasing said grinding wheel toward said grinding position and second spring means biasing said carriage means toward said grinding position, said first and second cylinder means being operable in opposition to said first and second spring means to move said grinding wheel and carriage away from said grinding position.

6. Apparatus according to claim 1 including cutter link hold-down means movable between operable and inoperable positions and spring-biased to an operable position, and means operable in response to movement of said grinding wheel away from said grinding position to move said hold-down means away from its operable position.

7. Apparatus according to claim 1 including saw chain link sensing means for sensing the presence of a cutter link in position for grinding and means operable in response to the absence of the sensing of a link by said sensing means to deactivate said grinding wheel to prevent grinding.

8. Apparatus according to claim 1 wherein said indexing means includes a one-way clutch means associated with said chain wheel and a one-way chain stop adjacent said grinding position for disengaging said clutch from said chain wheel when a cutter link abuts an operable portion of said stop.

9. Apparatus according to claim 1 including carriage adjustment means for controlling the limit of travel of said carriage relative to said grinding position and thereby controlling the extent of grinding interaction between a cutter link and the grinding wheel at said grinding position.

10. Apparatus according to claim 9 including stationary base support means mounting said carriage means for reciprocative movement thereon, said second hydraulic pressure-operated means including a hydraulic cylinder means acting between said base support means and said carriage means, said adjustment means including means providing a movable abutment surface on one of said carriage means and base support means for abutment with said cylinder means and for changing the relative positions of said carriage means and base support means along their interface upon movement of said abutment surface, and threaded means for controlling the movement of said abutment surface.

11. Apparatus according to claim 10 wherein said cylinder means is mounted to a cylinder mounting surface of said carriage means to move therewith and includes a relatively stationary piston including a piston rod in abutment against said abutment face, and shim means insertable between said mounting surface and said piston for controlling the stroke of said cylinder means and thereby the travel distance of said carriage means.

12. An automatic saw chain grinder for grinding a selected surface of successive cutter links of a saw chain, comprising:

a rotatable grinding wheel, mounting means mounting the grinding wheel for movement toward and away from a grinding position, first fluid pressure-operated means acting on said mounting means for controlling the movement of said grinding wheel toward and away from said grinding position, saw chain support means for mounting a saw chain for indexing movement therealong to index successive cutter links for grinding, carriage means mounting said support means for reciprocation to move a cutter link on said support means between said grinding position and a retracted position, second fluid pressure-operated means acting on said carriage means for controlling said reciprocation, fluid pressure operating means including a source of fluid pressure and fluid conduit means for activating said first and second pressure-operated means, first sequencing means operable upon activation of said first and second pressure-operated means to control the sequence of operation thereof such that said grinding wheel moves to said grinding position before said carriage means moves a cutter link to said grinding position and such that said carriage means moves said cutter link away from said grinding position before said grinding wheel moves away from said grinding position, power-operated indexing means for moving said saw chain along said support means to index successive cutter links for sharpening, and second sequencing means operable to control the sequence of operation of said indexing means and said fluid pressure operating means such that a first cutter link is indexed on said support means for sharpening before said grinding wheel moves into grinding position and such that the next successive cutter link is indexed for sharpening after said grinding wheel is moved from its grinding position.

13. An automatic saw chain grinder for grinding a selected surface of successive cutter links of a saw chain, comprising:

a rotatable grinding wheel, mounting means mounting the grinding wheel for movement toward and away from a grinding position, first fluid cylinder means for moving the grinding wheel toward and away from said grinding position, saw chain support means for mounting a saw chain for indexing movement therealong to index successive cutter links for grinding, carriage means mounting said support means for moving an indexed cutter link to and from said grinding position;

second fluid cylinder means for operating said carriage means to move a cutter link to and from said grinding position, first sequencing means for controlling the sequential operation of said first and second fluid cylinder means such that (1) said first cylinder means enables movement of said grinding wheel to said grinding position before said second cylinder means enables said carriage means to move said cutter link to said grinding position, but (2) said second cylinder means enables said carriage means to move said cutter link away from said grinding position before said first cylinder means enables movement of said grinding wheel away from said grinding position, saw chain stop means cooperative with said support means for determining an indexed position of a cutter link on said support means, power-operated indexing means for moving a saw chain along said support means in a first direction to advance a cutter link past said stop means and then in a reverse direction to back said cutter link against said stop means at said indexed position, second sequencing means operable to control the operating sequence of said indexing means and said first sequencing means such that said indexing means operates to index a cutter link on said support means at said indexing position before said first sequencing means enables movement of said grinding wheel to said grinding position and such that said first sequencing means enables movement of said grinding wheel away from said grinding position before said indexing means advances the next successive cutter link to said indexed position.

14. Apparatus according to claim 13 wherein said indexing means includes pitch adjustment means for varying the indexing movement of a saw chain on said support means to accommodate saw chains of different pitches.

15. Apparatus according to claim 13 wherein said indexing means includes a pulley wheel for mounting with said support means a loop of saw chain, said wheel being mounted to a shaft by clutch means, and power-operated reciprocating rod means connected to said clutch means, said rod means being operable upon movement in one direction of reciprocation to rotate said clutch and thus said wheel through a predetermined arc in one direction to advance said saw chain in said first direction on said support means, said rod means being operable upon movement in an opposite direction of reciprocation of rotate said clutch through said predetermined arc in an opposite direction and thereby move said saw chain on said support in said reverse direction to back a cutter link against said stop means and thereafter release said wheel from said clutch.

16. Apparatus according to claim 15 including pitch adjustment means for varying the distance of indexing movement of a saw chain on said support means upon reciprocation of said rod means, said pitch adjustment means including means for varying said predetermined arc.

17. Apparatus according to claim 16 wherein said means for varying said predetermined arc includes stop means adjacent said clutch means abutment means on said assembly for abutting said stop means and thereby limit said arc, one of said stop means and abutment means being adjustable, said rod means including lost motion means operable when said abutment means engages said stop means.

18. Apparatus according to claim 16 wherein said pitch adjustment means includes means for adjusting the effective length of said rod means to vary said arc.

* * * * *